April 28, 1970   J. F. MAHONEY ET AL   3,508,539
COMBINED X-RAY AND SPIROMETER RECORDING MEANS
Filed Dec. 22, 1966   3 Sheets-Sheet 1
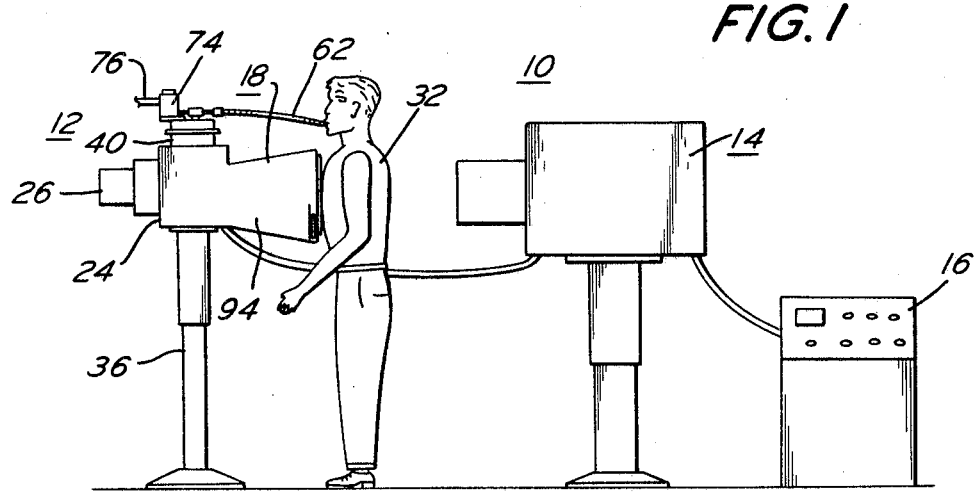
FIG.1
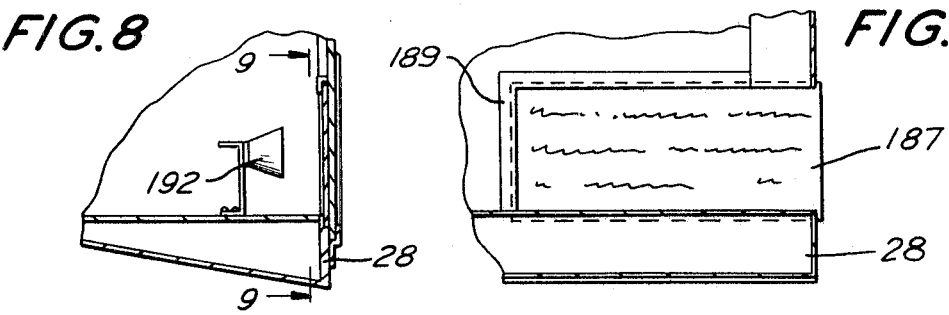
FIG.8
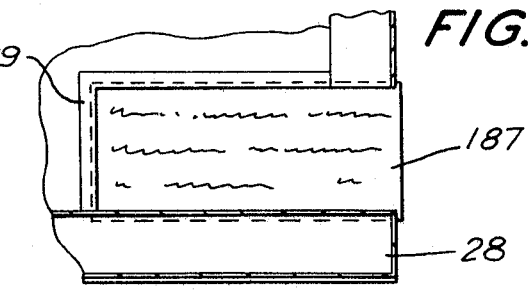
FIG.9
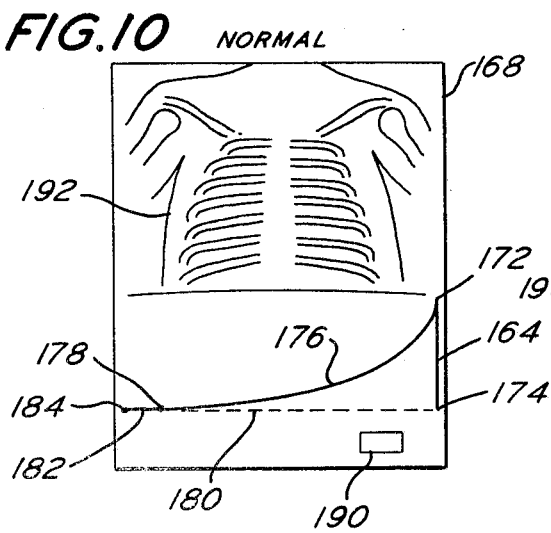
FIG.10   NORMAL
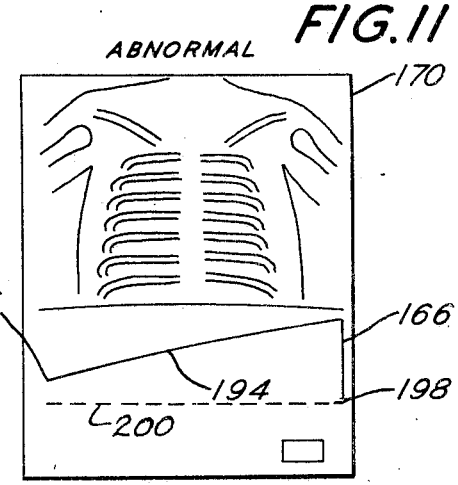
FIG.11   ABNORMAL
INVENTORS.
JEREMIAH FRANCIS MAHONEY
ROBERT B. HANES
WILLIAM R. LATADY
BY
Jacob Trachtman
ATTORNEY April 28, 1970   J. F. MAHONEY ET AL   3,508,539
COMBINED X-RAY AND SPIROMETER RECORDING MEANS
Filed Dec. 22, 1966
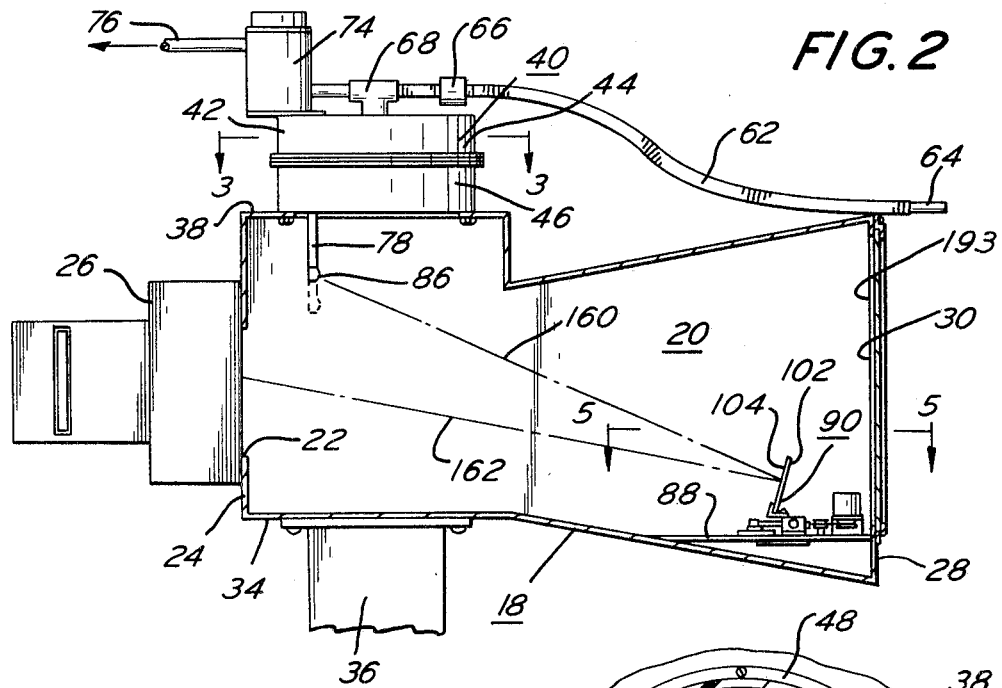
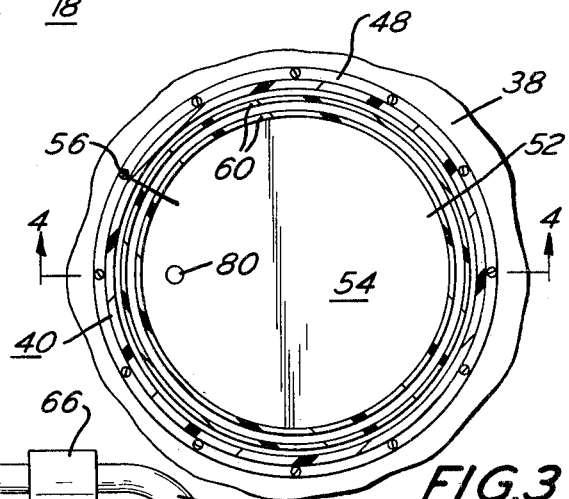
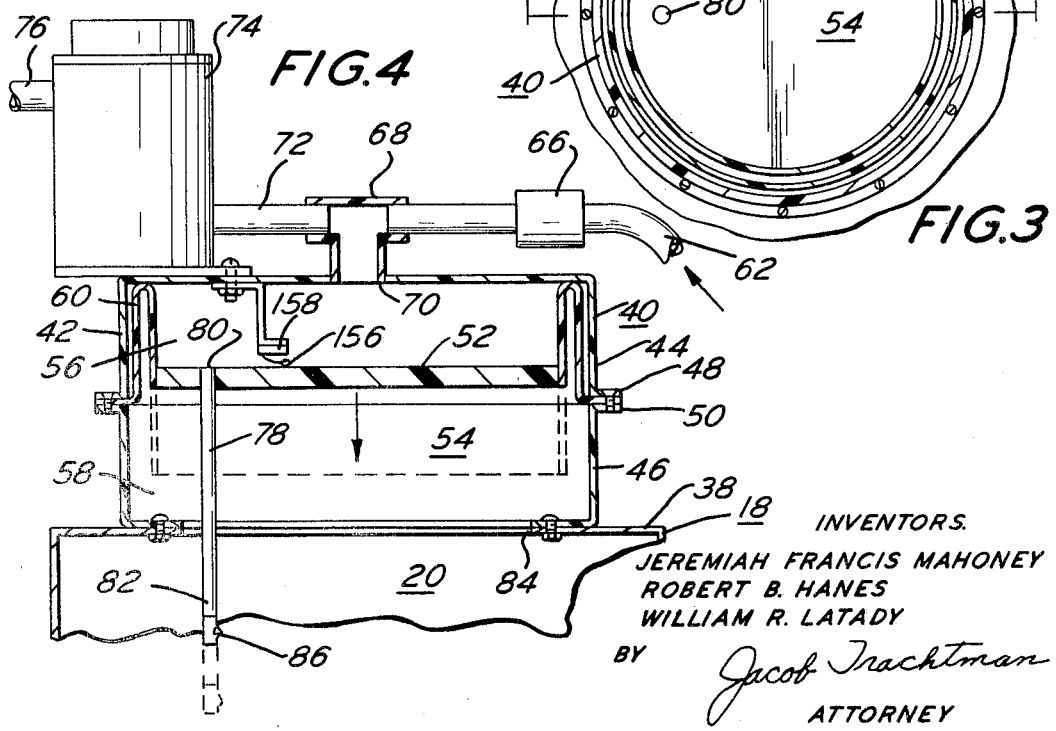
INVENTORS.
JEREMIAH FRANCIS MAHONEY
ROBERT B. HANES
WILLIAM R. LATADY
BY Jacob Trachtman
ATTORNEY

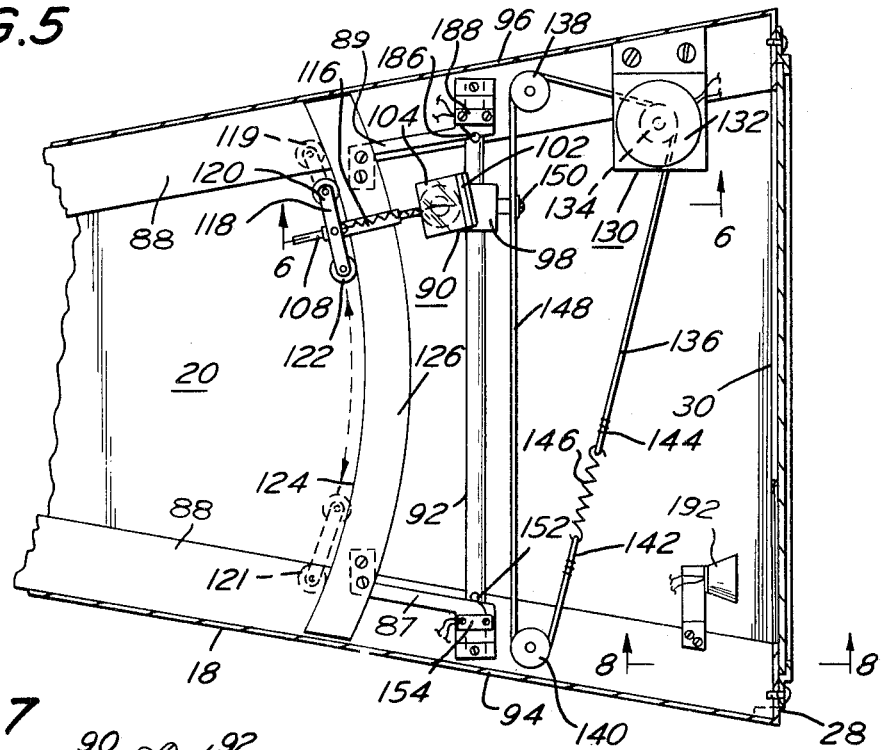
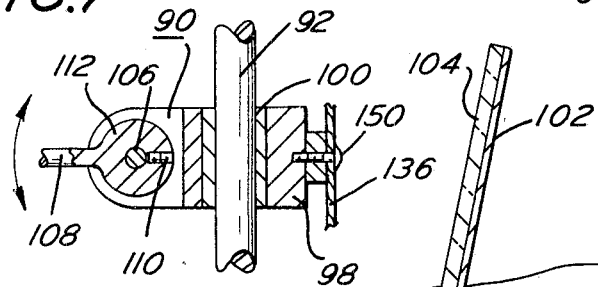
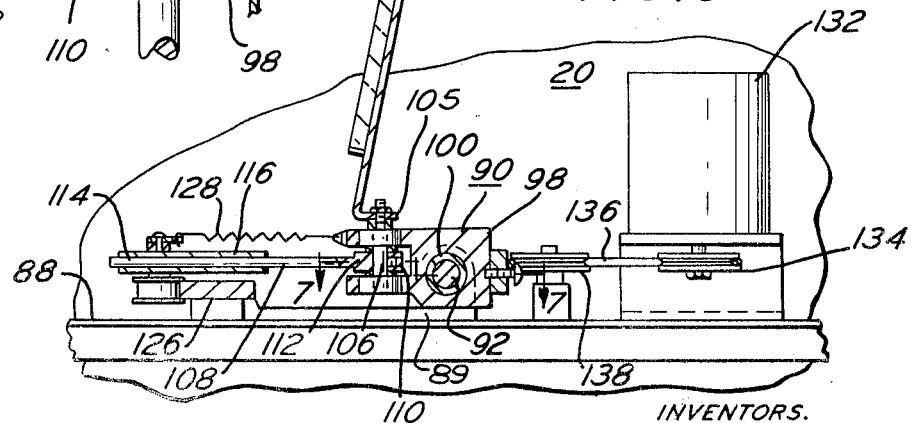

United States Patent Office 3,508,539
Patented Apr. 28, 1970

3,508,539
COMBINED X-RAY AND SPIROMETER
RECORDING MEANS
Jeremiah F. Mahoney, 324 Ingeborg Road, Philadelphia, Pa. 19151; Robert B. Hanes, 1902 Greenhill Road, Lansdowne, Pa. 19050; and William R. Latady, 345 E. Gowen Ave., Philadelphia, Pa. 19119
Filed Dec. 22, 1966, Ser. No. 603,911
Int. Cl. A61b 5/08
U.S. Cl. 128—2.08                                    10 Claims

ABSTRACT OF THE DISCLOSURE

A diagnostic recording means comprising a body having an enclosed chamber, photographic means for making a record responsive to light within said chamber, spirometer means responsive to the pulmonary function of a subject under diagnostic testing, a source of light positioned within said chamber and actuated by said spirometer means for movement along a path, and projecting means for directing light from said source for recordation by said photographic means. Said body may also include a fluoroscopic screen for providing an X-ray image in said chamber of the subject being tested for recording by said photographic means upon said same record recording the light projected by said light source.

---

The invention relates to a diagnostic recording means, and more particularly to a means for recording on a single photographic film, a chest X-ray as well as pulmonary functions such as the vital pulmonary capacity and the rate of pulmonary exhalation, of a subject being tested.

In diagnosing respiratory diseases such as emphysema, chronic bronchitis, carcinoma and other industrial diseaes, chest X-ray film along is not most effective, except in the more extreme cases. This is because chest X-ray films show the chest morphology rather than its functions.

Physiologic or functional measurements of the chest have been made in the laboratories of some of the larger institutions by means of an instrument called a spirometer.

The present invention provides mass survey means for early detection of respiratory diseases by producing on a single record, the chest X-ray record of a subject being tested as well as a record of the pulmonary functions of the subject. The pulmonary functions of the subject recorded are the total amount of air which can be exhaled after full inspiration and designated the vital capacity of the subject, as well as a timed record of the vital capacity which is a curve of a spirogram showing the air expelled as a function of time, under forced exhalation of the subject. Studies have shown that a normal individual should be able to exhale 83% of his air in the first second, 87% in the second second and 93% in the third second. In cases of obstructive diseases such as emphysema, it has been found that these subjects may have difficulty in exhaling even 25% of their vital capacity in the first second. In addition, their total vital capacity may be markedly reduced with respect to the normal total capacity. The early detection of chest problems allows the institution of therapy which often results in arresting the disease. Thus, though many of the disease processes are readily reversible, if detected in their early stages, the major problem has been one of early detection. Due to the failure of detection, there is estimated to be some ten to fifteen million resipratory disease cases in this country.

It is therefore a principal object of this invention to provide a new and improved diagonistic recording means adaptable to mass survey techniques for detecting resipiratory diseases.

Another object of the invention is to provide a new and improved diagnostic recording means which recorded on the same record morphological as well as physiological information regarding the subject being tested.

Another object of the invention is to provide a new and improved diagnostic recording means having means for efficiently and effectively recording the pulmonary function of a subject being tested.

Another object of the invention is to provide a new and improved diagnostic recording means which is efficient in operation and reliable in performance.

The above objects of the invention are achieved by providing a diagnostic recording means comprising a body having an enclosed chamber, photographic means responsive to light produced within said chamber and responsive means including a source of light positionally movable within said chamber responsive to the pulmonary function of a subject under diagnostic study for recording by said photographic means. The responsive means includes spirometer means for receiving pulmonary exhalation from a subject and a probe element actuated by said spirometer means supporting said source of light within said chamber in a position which is a function of the volume of exhalation received by said spirometer means.

The spirometer means includes a unit having walls providing a cavity for receiving pulmonary exhalation from a subject and a piston therein which moves responsive to the receipt of expired air into said cavity, said probe element being actuated with movement of said piston. The probe means moves along a linear path, while a projecting means for directing light from the source of light transverse to the linear path of said source provides a two dimensional light trace for recordation by said photographic means. The projecting means includes light reflecting means mounted for movement along a horizontal linear path, while being pivotable about a vertical axis. An arcuate guide means pivotally positions said reflecting means during its movement along its linear translational path for directing and scanning light from said source toward and across said photographic means.

The body includes a fluoroscopic screen for providing an X-ray image in said chamber of the subject being tested for recording by said photographic means upon the same record which records the functional traces of said subject. The body provides a surface proximate said screen for receiving the chest portion of the subject of which a fluoroscopic image is to be produced by said screen. A source of X-rays is positioned for directing X-rays through the subject being tested for impingement upon said screen to produce said fluoroscopic image for recordation by the photographic means with said pulmonary function tracings of the subject.

The above objects of the invention as well as many other objects will become apparent when the following description is read in conjunction with the drawing, in which:

FIGURE 1 is a front elevational vew of a diagnostic recording means embodying the invention illustrating its use in connection with a subject being tested, FIGURE 2 is an enlarged sectional view of the record producing portion of the diagnostic recording means, FIGURE 3 is an enlarged sectional view with portions broken away taken on a line 3—3 of FIGURE 2, FIGURE 4 is a sectional view taken on a line 4—4 of FIGURE 3, FIGURE 5 is an enlarged sectional view taken on a line 5—5 of FIGURE 2, FIGURE 6 is an enlarged sectional view with portions broken away taken on a line 6—6 of FIGURE 5, FIGURE 7 is a sectional view taken on a line 7—7 of FIGURE 6, FIGURE 8 is a fragmentary section of a view taken on a line 8—8 of FIGURE 5, FIGURE 9 is a sectional view taken on a line 9—9 of FIGURE 8, FIGURE 10 illustrates a record produced by the diagnostic recording means of a normal subject, and FIGURE 11 illustrates a record made by the diagonistic recording means of an abnormal subject.

Like reference numerals designate like parts throughout the several views.

FIGURE 1 discloses a diagnostic recording means 10 embodying the invention including a record producing portion 12, an X-ray generating means 14 and an electrical control console 16.

The record producing portion 12 of the diagnostic recording means 10 comprises a body 18 having a light proof chamber 20 provided with an opening 22 at one end 24 (see FIGURE 2). A photographic means 26 of the conventional type provided with a lens and a sensitized sheet means for recording light received from within the chamber 20 of the body 18, is secured at the end 24 of the body 18 with its lens proximate the opening 22.

The end 28 of the body 18 opposite the photographic means 26 is enclosed by a floroscopic screen 30 which produces light within the chamber 20 upon impingement by X-rays. As seen from FIGURE 1, a subject 32 under diagnostic testing is positioned with his chest proximate to the end 28 of the body 18 and the fluoroscopic screen 30.

The body 18 is supported at its bottom 34 (see FIGURE 2) by a stand member 36 which may be provided with vertical adjusting means for accommodating the height of the subject 32. The top 38 of the body 18 supports a spirometer means 40 which includes a cylindrical unit 42 provided with top and bottom sections 44, 46 joined centrally by respective flanges 48 and 50. A circular piston plate 52 (see FIGURE 4) is movably received within the cavity 54 of the unit 42 dividing same into upper and lower sections 56 and 58. The piston plate 52 is sealed with the sections 44 and 46 of the unit 42 by a flexible folded rollable diaphragm 60 having an outer edge sealed between the flanges 48 and 50 of the sections 44 and 46 while its inner edge is secured with the rim of said piston plate 52. The diaphragm 60 provides minimal resistance to movement of the piston plate 52 with the exertion of resultant upward and downward pressure thereon.

A tube 62 having an end 64 positioned for receiving pulmonary exhalation from a subject 32 is connected through a valve 66 and a fitting 68 and through an opening 70 in the section 44 of the unit 42 with the upper section 56 of the chamber 54. The section 56 of the chamber 54 is also connected by the fitting 68 through a tube 72 with an air exhaust motor 74 which has an air exhaust outlet tube 76. The bottom section 58 is vented to atmospheric pressure.

A probe element 78 has its top 80 connected with the piston plate 52 and extends vertically downward with its bottom end 82 received through an opening 84 into the chamber 20 of the body 18. The end 82 is provided with a source of light 86 such as an electric light bulb which directs light in the direction towards the end 28 of the body 18. The source of light 86 moves up and down in a vertical linear path with the movement of the piston plate 52.

A pair of horizontal brackets 88 are secured at the bottom of said body 18 proximate its end 28 respectively along the sides 94, 96 and support a projecting means 90 by means of two brackets 87 and 89 which is clearly seen from FIGURES 2, 5 and 6. The projecting means 90 comprises a horizontal rod 92 supported at its ends by said brackets 87 and 89 and extending between the vertical sides 94, 96 of said body 18 parallel to the flouorscopic screen 30. A reflector carriage 98 of the means 90 is provided with a bearing lined opening 100 for slidably receiving the rod 92 therethrough. A light reflecting means 102 provided with a light reflecting front surface 104 disposed at a small angle to the vertical direction is secured at its bottom 105 with the top of a pin 106 which is mounted in said carriage 98 for pivotal motion about its vertical axis. A director rod 108 is clamped by a screw 110 at its end 112 with the pivotable pin 106 as shown in FIGURES 6 and 7. The extending end 114 of the rod 108 is slidably received through a sleeve element 116. The sleeve element 116 is secured in a perpendicular relationship to the cross arm 118 of a guide carriage 120 having wheels 122 at each end engaging the inner edge 124 of an arcuate track 126. The wheels 122 of the carriage 120 are maintained in contact with the inner edge 124 of track 126 by a spring 128 connected between and urging the guide carriage 120 towards the reflector carriage 98.

The inner edge 124 of the track 126 is a portion of a circle having its center on a line of the vertical linear path of the probe element 78. Thus, as the carriage 98 of the projecting means 90 moves linearly along the rod 92, the director rod 108 moves the carriage 120 along the arcuate edge 124 while also moving with respect to the sleeve element 116 and being oriented in the radial direction towards the center of the arcuate track 124. Since the director rod 108 is clamped with the pin 106, it also acts to rotate and orient the reflecting surface 104 of the reflecting means 102 so that it is directed towards the probe element or a point on its vertical line of travel as its center.

A carriage drive means 130 comprises a constant speed reversible motor 132 which drives a pulley wheel 134 which receives about it a drive band 136. The band 136 also passes about idler wheels 138 and 140. The ends 142 and 144 of the band are joined by a spring 146 providing proper band tension. The run 148 of the band 136 between the idler wheels 138 and 140 is parallel to the rod 92 and is secured by screw 150 with the carriage 98. The reversible type motor 132 is energizable for actuating the band 136 in the clockwise or counter clockwise directions for moving the carriage 98 at a constant speed along the rod 92 in either direction between the left and right terminal positions illustrated respectively by the positions of the guide carriage 120 shown by dashed lines at 119 and 121.

In the operation of the diagnostic recording means for mass survey studies, the following procedure is carried out with respect to each object of the survey. With the subject 32 positioned as shown in FIGURE 1, the record producing means 12 is controlled by the console 16 to place it in its ready condition. In this condition, the carriage 90 is positioned in its left terminal positon contacting the actuating lever 152 of the microswitch 154 and proximate the side 94 of the body 18, as for example (see FIGURE 5) by actuation of such control switches which may be provided on the console 16. With the carriage 98 in this terminal position and the plate piston 52 in its uppermost position as shown in FIGURE 4 engaging the actuating lever 156 of the microswitch 158, the subject is requested to take the deepest possible breadth and expel the air in his lungs as forcefully as possible through the tube 62. The valve 66 provides minimum resistance for the passage of air therethrough into the section 56 of the chamber 54 of the spirometer means 40 by way of the fitting 68. Since the air exhaust motor 74 is inactivated, it provides no discharge path for the air being expelled into the tube 62 so that all such air must be received into the section 56 of the spirometer means 40. Since the rollable flexible diaphragm 60 allows the piston plate 52 to move with the exertion of a minimum force thereon, the piston 52 moves downwardly responsive to the receipt of air into the section 56. As the piston plate 52 loses contact with the arm 156 of the microswitch 158, the light source 86 supported by the probe element 78 is energized to produce a light beam which is directed towards the end 28 of the body 18. The emitted beam of light from the source 86, which is represented by the dashed line 160 in FIGURE 2 within the chamber 20, is reflected from the surface 104 of the reflecting means 102. The reflected beam is represented by the dashed line 162. As well known from the principles of optics, the angle of incidence of the beam 160 is equal to the angle of reflection of the beam 162 at the reflecting surface 104 of the reflecting means 102. Thus, as the source of light 86 moves downwardly the angle of incidence of the beam 160 decreases, as does the angle of reflection causing the reflected beam 162 to move upwardly. When all of the air has been expelled by the subject 32, the light source 86 has moved downwardly to the lower position corresponding to the total expelled volume of air, or the vital capacity of the subject 32. At this time the reflected beam 162 has moved upwardly to an upper position corresponding to the downwardly displaced position of the source 86. With a light sensitive sheet of material positioned in the camera 26, a latent line record is made on the sensitive sheet by the reflected beam 162 corresponding to the vertical lines 164, 166 of the normal and abnormal records 168 and 170 produced by the diagnostic recording means 10 illustrated in FIG-URES 10 and 11. Thus the vertical line 164 of FIGURE 10 is traced by starting at the point 172 when the subject 32 starts to exhale and the piston plate 52 initiates its downward movement causing the illumination of the light source. The line 164 is traced downwardly from the initial point 172 until the terminal point 174 is reached which represents the total vital capacity of the subject being tested. Thus the length between the upper and lower points 172 and 174 of the vertical line 164 represents the volume of the air expelled by the subject 32. Of course, the length of this line 164 may be calibrated to the volume of the section 56 of the spirometer means 40 and this may be directly read on an appropriate linear scale with the point 172 representing the zero index. It will also be evident, that the inversion produced by the lens of the camera 26 results in the line 164 being recorded on the right side of the record 168 when the reflecting means 102 is positioned on the left side of the body 18 proximate the wall 94. Similarly the inversion provided by the lens of the camera 26 results in the line 164 being traced from top to bottom when the reflaected beam 162 moves in an upward direction with the lowering of the light source, 86.

After thus recording the vital capacity by a line such as lines 164 and 166 respectively of the records 168 and 170, the recording means 10 is conditioned for the next recording step by actuation of the air exhaust motor 74 which draws air out of the section 56 of spirometer means 40 causing the piston plate 52 to move upwardly. During the time of operation of the motor 74, the valve 66 is closed by either electrical means or by the suction produced by the operation of the motor 74 and the light source 86 is extinguished. When the piston plate 52 reaches its uppermost terminal position as shown in FIG-URE 4 it actuates the arm 156 of the microswitch 158 which may serve to turn off the motor 74.

The subject 32 is now again requested to take a deep breath and proceed as previously by expelling the air in his lungs through the tube 62 in the most forceful manner possible for the subject. However, at this time a record is made of the time rate of expulsion of air by the subject 32 by the activation of the constant speed motor 132 beginning with the slightest downward movemen of the plate piston 52. For this purpose, in addition to the microswitch 158 acting to energize the light source 86, this switch 158 or another one like it may also be appropriately connected as well known in the art, to result in the energization of the motor 132 for actuating the band 136 in the clockwise direction as seen in FIGURE 5 for moving the carriage 98 from its left terminal position towards its opposite right terminal position proximate the side 96 of the body 18. At this time the reflecting surface 104 of the reflecting device 102 towards the vertical line vide a reflected beam of light 162 as previously explained which moves in the upward direction with the downward movement of the source of light 86 to maintain equal angles of incidence and reflection at the surface 104. However, since the carriage 98 also moves during this period of time, along a linear horizontal path along the rod 92, the reflected beam of light 162 which initially is reflected toward the right side 96 of the body 18 through the opening 22 for receipt by the camera 26 is caused to move toward the left side 94 with the movement of the carriage 98 toward the right side 96 of the body 18. In view of the particular means for directing the surface 104 of the reflecting device 102 towards the vertical line of the path of the source 86, the reflected beam 162 also passes through and intersects the vertical line. Of course, this arrangement assures that the reflected beam will be deflected from side to side within an angular range which may be received and recorded by the camera means 26.

The curve 176 of the record 168 of FIGURE 10 represents the trace produced by the diagnostic recording means showing the time function of the air expelled by the subject 32 under test. As before the curve traced begins at the point 172 and moves toward the left with the passage of time. When the curve traced reaches the point 178 (at which time all of the expellable air has been exhaled by the subject 32) corresponding to the lowest vertical point 174 of the line 164 representing the vital capacity of the subject, the total time required can be measured along the horizontal abscissa 180 with a time scale which is related to the translational speed of the carriage 98. Upon reaching this lowest level, the remainder of the trace 182 will remain level providing a horizontal line segment 182. Upon reaching the end point 184 of the curve 176, the carriage 98 contacts the actuating lever 186 of the microswitch 188, which may act to deactivate the motor 132. At this time a latent image of both the vital capacity line such as 164 and the curve such as 176 of the record 168 as an example, have been recorded, and the subject 32 is now positioned for recording an X-ray image of his chest.

The body 18 may also be provided with an appropriate card 187 which may be slid into a receptacle 189 provided in the end 28 of the body 18 in the same plane with the surface of the fluoroscopic screen 30. Such card 187 may have imprinted thereon data such as the name and number assigned to the subject 32, the name of the hospital taking the survey and other pertinent information which may be desired for inclusion on the record in a location 190 at the bottom of the record 168. A directed light source 192 illuminates the data bearing surface of the card 187 for a predetermined required exposure time, which may take place at the time the X-ray image of the subject is produced.

The X-ray image of the subject 32 is produced within the chamber 20 on the inside surface 193 of the fluoroscopic screen by impingement of X-rays produced by the X-ray generating means 14 under the control of the console 16. The X-rays from the source 14, as is the usual practice may be adjusted for hardness to appropriately penetrate and pass through the chest of the subject 32 for providing required fluoroscopic image on the surface 193 and for the required duration for producing a latent image of the screen 30 on the sensitive sheet or film of the photographic means 26.

The film, thus produced, of the subject 32 bears the latent images of the pulmonary functions of the subject 32 including the vital capacity line, such as line 164, and the curve 176 representing the exhalation function of the subject 32 with the passage of time, as well as the latent X-ray image on the surface 193 and other vital data 190. With all this information present on the film, the film may be stored for later mass development in the well known manner to produce composite records, such as the record 168, at a later time, of the numerous subjects 32 of the mass survey.

After completing the exposure of a film, the film may immediately be replaced by a new unexposed film for producing a record of the next subject 32 in the same manner described in detail for the first subject 32. However, before initiating a new testing operation, the exhaust motor 74 is energized, at which time the valve 66 is closed, either by electrical actuating means or by the action of the suction produced by the motor 74 and all of the removeable air present in the section 56 is discharged through the tube 76, whereupon the plate piston 52 is moved in the upward direction until it contacts the lever at 156 at the microswitch 158. The actuation of the microswitch 158 at this time may act to turn off the motor 74. Concurrently with the energization of the exhaust motor 74, the motor 132 is energized for actuating the band 132 in the counter clockwise direction for moving the carriage 98 toward its initial left terminal position contacting the microswitch 154. Of course, the microswitch upon actuation may serve to de-energize the motor 132 and prepare the motor for motion in the opposite direction during the recording of the time function trace of the subject 32 as previously described in connection with the light projecting means 90 and reflector carriage 98.

As described above, many records may be made of a correspondingly large number of subjects 32 within a short period of time, adapting the diagnostic recording means for efficient use as a mass diagnostic survey means. Upon a careful study of the resulting records 168, early cases of chest disease may be diagnosed and treated and advanced cases can be found which might not otherwise be detected.

Referring to FIGURE 11, which discloses an abnormal record 170, it is noted that the length of the vital capacity line, 166, in this case, is shorter than that for the normal subject represented by the line 164 of the record 168 indicating a reduced capacity of the subject 32 to exhale the air in his lungs. The time function curve 194 of the abnormal record 170 is substantially linear showing no change in rate of air expulsion, whereas the normal curve 176 of the record 168 indicates a higher rate of expulsion at the beginning of the curve traced when the lungs are full. The abnormal curve 194 therefore indicates a constant high resistance to expulsion of air. This is confirmed by the end point 196 of the curve 194 which indicates that the subject has not, at the completion of the maximum time period covered by the curve 194, expelled all of the air in his lungs as represented by the dashed line 200 which is a horizontal projection of the end point 198 of the vital capacity line 166.

Thus with the examination of the mass of records produced by the survey, such abnormal records may be selected, the subjects 32 identified, and remedial action taken at the earliest possible time.

Although the invention has been disclosed with regard to a particular embodiment described herein, it will be obvious to those versed in the art, that various changes may be made in the disclosed means without departing from the scope of the invention.

What is claimed is:

1. A diagnostic recording means comprising a body having an enclosed chamber, photographic means for making a record responsive to light within said chamber, spirometer means for receiving pulmonary exhalation from a subject under diagnostic testing, a source of light positioned within said chamber and actuated by said spirometer means for movement along a path, and movable projecting means for directing light from said source for recordation by said photographic means.

2. The means of claim 1 in which said spirometer means for receiving pulmonary exhalation from a subject includes a probe element actuated for movement along said path by said spirometer means and extending into and supporting said source of light within said chamber in a position which is a function of the volume of exhalation received by said spirometer means.

3. The means of claim 2 in which said spirometer means includes a unit having walls providing a cavity for receiving pulmonary exhalation from a subject and a piston therein which moves responsive to the receipt of exhalation into said cavity, said probe element being actuated with the movement of said piston.

4. The means of claim 3 in which said piston is moveably sealed with the walls of said unit by a flexible, rollable diaphragm for minimizing the force required for moving said piston upon the exertion of pressure by the exhalation received in the chamber of said unit.

5. The means of claim 2 in which said probe element moves said source of light along a vertical path, and said projecting means includes a light reflecting device mounted for movement along a horizontal path for directing light from said source toward said photographic means and providing a two dimensional trace for recordation by said photographic means, and means for driving said reflecting means along said path.

6. The means of claim 5 in which said projecting means includes a linear element for supporting said reflecting device for linear translational movement along a horizontal linear path, said reflecting means being supported for pivotal movement about a vertical axis, and arcuate guide means secured with said reflecting means for pivotally positioning said reflecting means as said reflecting means is actuated along its linear path for directing light from said light source toward said photographic means.

7. The means of claim 6 in which said arcuate guide means comprises a track unit having a center on the line of the vertical linear path of said probe element, a carriage movably engaging said arcuate guide means and radially directing an extending member secured and movable with said reflecting means for pivotally positioning said reflecting means toward said arcuate center with the translational linear movement of said reflecting means for directing light from said light source toward said photographic means.

8. The means of claim 7 in which said body includes a fluoroscopic screen for providing an X-ray image in said chamber of the subject being tested for recording by said photographic means upon the same record recording said two dimensional trace of said subject.

9. The means of claim 8 in which said body provides a surface proximate said screen adapted to receive the portion of said subject of which a fluoroscopic image is to be produced by said screen, and including a source of X-rays positioned for directing X-rays through said subject being tested and impingement upon said screen.

10. A diagnostic recording means comprising a body having an enclosed chamber, photographic means for making a record responsive to light within said chamber, spirometer means for receiving pulmonary exhalation from a subject, a probe element actuated by said spirometer means and extending into said chamber, a source of light within said chamber supported by said probe element in a position which is a function of the volume of exhalation received by said spirometer, said spirometer means actuating said probe means along a linear path responsive to the volume of expiration received by said spirometer means, and a movable projecting means for directing light from said source of light in a direction transverse to the linear path of said source for providing a two dimensional trace for recordation by said photographic means.

References Cited

UNITED STATES PATENTS

| | | | |
|---|---|---|---|
| 1,974,174 | 9/1934 | Chamberlain | 250—67 XR |
| 2,650,308 | 8/1953 | Catlin | 250—65 XR |
| 2,944,542 | 7/1960 | Barnett et al. | 128—2.05 |
| 3,081,766 | 3/1963 | Dubsky et al. | 128—2.08 |
| 3,086,515 | 4/1963 | Jones | 128—2.08 |
| 3,220,404 | 11/1965 | Del Lucchese | 128—2.05 |
| 3,395,699 | 8/1968 | Beasley | 128—2.08 |

FOREIGN PATENTS

| | | |
|---|---|---|
| 74,108 | 1/1918 | Austria. |
| 136,007 | 1/1960 | USSR. |

RICHARD A. GAUDET, Primary Examiner

K. L. HOWELL, Assistant Examiner

U.S. Cl. X.R.

250—65